United States Patent
Hiller

(10) Patent No.: US 8,682,173 B1
(45) Date of Patent: Mar. 25, 2014

(54) COMMUNICATION USING MODULATED WAVES APPLIED TO AN OPTICAL FIBER

(75) Inventor: Nathan D. Hiller, Irvine, CA (US)

(73) Assignee: The Boeing Company, Chicago, IL (US)

( * ) Notice: Subject to any disclaimer, the term of this patent is extended or adjusted under 35 U.S.C. 154(b) by 138 days.

(21) Appl. No.: 13/268,217

(22) Filed: Oct. 7, 2011

(51) Int. Cl.
| | |
|---|---|
| *H04B 10/12* | (2011.01) |
| *H04B 10/08* | (2011.01) |
| *H04B 17/00* | (2006.01) |
| *H04B 10/00* | (2013.01) |
| *H04B 13/02* | (2006.01) |
| *H04B 10/06* | (2011.01) |

(52) U.S. Cl.
USPC ............. 398/141; 398/21; 398/104; 398/140; 398/202; 398/214

(58) Field of Classification Search
USPC ......... 398/104, 106, 113, 142, 202, 207, 212, 398/214
See application file for complete search history.

(56) References Cited

U.S. PATENT DOCUMENTS

| | | | |
|---|---|---|---|
| 5,194,847 A | | 3/1993 | Taylor et al. |
| 7,336,898 B2 * | | 2/2008 | Fling et al. ...................... 398/21 |
| 7,755,971 B2 * | | 7/2010 | Heatley et al. .................. 367/16 |
| 2007/0103670 A1 * | | 5/2007 | Sezerman et al. ........... 356/73.1 |
| 2007/0183782 A1 * | | 8/2007 | Farr et al. ...................... 398/104 |
| 2008/0317476 A1 * | | 12/2008 | Tsuji et al. .................... 398/140 |
| 2009/0103928 A1 * | | 4/2009 | Healey et al. ................. 398/140 |
| 2009/0114386 A1 * | | 5/2009 | Hartog et al. ............ 166/250.08 |
| 2010/0157736 A1 * | | 6/2010 | Riordan et al. .................. 367/88 |
| 2011/0216996 A1 * | | 9/2011 | Rogers ............................ 385/12 |

OTHER PUBLICATIONS

Cochenour et al., Spatial and temporal dispersion in high bandwidth underwater laser communication links, 2008 Military Communications Conference, MILCOM 2008, (7 pgs).
Liu et al., Damage detection in composites with embedded fibre optic interferometric sensors, SPIE vol. 1170, Fiber Optic Smart Structures and Skins II, 1989, (6 pgs).
Soller et al., Fiber Keying for Optical Network Intrusion Monitoring, OSA/OSHS 2005, (1 pg).
Lagakos et al., Phase-Modulated Fiber Optic Acoustic Sensors, ISA Transactions, vol. 28, No. 2, 1989, (6 pgs).
Snider et al., Border Security Utilizing a Distributed Fiber Optic Intrusion Sensor, http://www.ejkevents.com/maritime/White_Paper.pdf, 2008, (pgs).
Juarez et al., Distributed Fiber-Optic Intrusion Sensor System, Journal of Lightwave Technology, vol. 23, No. 6, Jun. 2005, (7 pgs).

* cited by examiner

*Primary Examiner* — Leslie Pascal
*Assistant Examiner* — Casey Kretzer
(74) *Attorney, Agent, or Firm* — Toler Law Group, PC

(57) ABSTRACT

A particular method includes applying light pulses to an optical fiber and receiving backscattered light at a phase-sensitive optical time domain reflectometry (OTDR) device. The backscattered light includes portions of the applied light pulses that are backscattered by the optical fiber. The method also includes determining a difference between the backscattered light and a backscatter pattern associated with the optical fiber. The method also includes determining a communication signal encoded in the backscattered light based on the difference, where the communication signal is encoded in the backscattered light responsive to mechanical waves applied to the optical fiber at a location remote from the phase-sensitive OTDR device.

20 Claims, 7 Drawing Sheets

COMMUNICATION USING MODULATED WAVES APPLIED TO AN OPTICAL FIBER

FIELD OF THE DISCLOSURE

The present disclosure is generally related to communication using modulated waves applied to an optical fiber.

BACKGROUND

Communication with underwater vehicles presents challenges due to attenuation properties of water. Because some types of signals tend to attenuate significantly in water, communication systems that rely on such signals may have relatively short operational ranges, relatively low bandwidth capacity, or require large power. For example, sonar and other sound-based communication techniques may suffer from relatively low bandwidth capacity.

To avoid issues with signal attenuation in free-space (e.g., using water as a communication medium) a tether that includes a communication medium such as wires or optical fiber may be used. The tether may connect an underwater vehicle to a receiving system. The communication medium may reduce signal attenuation; however, the tether may limit range and mobility of the underwater vehicle.

SUMMARY

A communication system capable of high-bandwidth, long-range communication between an underwater vehicle and a receiving system is disclosed. Existing infrastructure such as optical fibers may be used to facilitate such communications. To illustrate, an undersea optical fiber may be disturbed using vibrations from mechanical waves or other modulated waves. The mechanical waves may be applied to the optical fiber in a manner that has a relatively high attenuation rate in water. For example, the underwater vehicle may apply acoustical waves at a frequency that has a high attenuation rate in water resulting in communications that do not significantly affect an underwater acoustic environment around the underwater vehicle.

A phase-sensitive optical time domain reflectometry (OTDR) device may be coupled to the optical fiber and may detect reflected light that is responsive to a disturbance applied to the optical fiber. For example, the phase-sensitive OTDR device may determine a background reflection signal of the optical fiber when the optical fiber is not being disturbed. When mechanical waves or another disturbance are applied to the optical fiber, the phase-sensitive OTDR device may detect reflected light. The reflected light may encode a signal responsive to the mechanical waves. To illustrate, the mechanical waves may change a reflection signature of the optical fiber by disturbing impurities within the optical fiber that cause the reflection of light.

The phase-sensitive OTDR device may be positioned a significant distance away from the underwater vehicle that applies the mechanical waves. For example, the phase-sensitive OTDR device may be 25 km or more from the site at which the mechanical waves are applied to the optical fiber. Because the mechanical waves may have to travel a relatively short distance between the underwater vehicle and the optical fiber, a high data rate may be used. Thus, long distance high data rate wireless communication from an underwater vehicle may be accomplished. The phase-sensitive OTDR device may be coupled to a transmitter above sea. The transmitter may transmit information encoded in the mechanical waves received by the phase-sensitive OTDR device via the reflected light to a remote station such as a surface vessel or other system associated with the underwater vehicle. Accordingly, high data rate long distance wireless communication may be accomplished.

The features, functions, and advantages that have been described can be achieved independently in various embodiments or may be combined in yet other embodiments, further details of which are disclosed with reference to the following description and drawings.

DETAILED DESCRIPTION

According to an illustrative embodiment, communication systems and methods that are capable of high-bandwidth, long-range communications are disclosed. The communication systems may utilize modulated waves (e.g., mechanical waves) to transfer a detectable signal to an optical fiber, enabling high-bandwidth, long distance wireless communication between an underwater vehicle and multiple locations.

Figure 1:
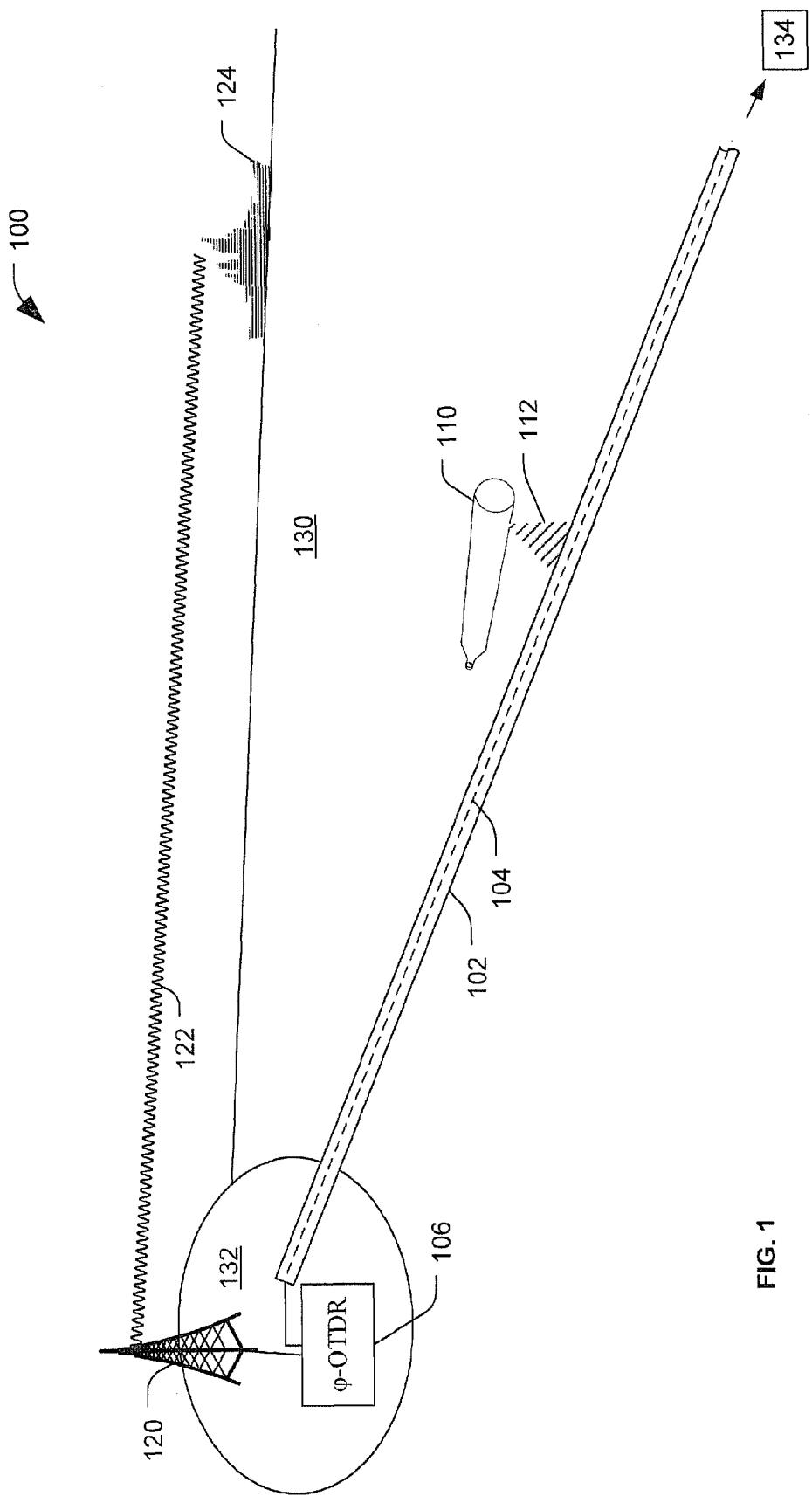
FIG. 1 is a diagram illustrating a communication system using modulated waves applied to an optical fiber.

FIG. 1 illustrates a wireless communication system 100. The wireless communication system 100 includes an optical fiber 102 that is adapted to carry light pulses 104. A phase-sensitive optical time domain reflectometry (OTDR) device 106 may be coupled to the optical fiber 102. The phase-sensitive OTDR device 106 may be adapted to receive reflections of the light pulses 104. The wireless communication system 100 also includes an underwater vehicle 110. The underwater vehicle 110 may be adapted to apply mechanical waves 112 to the optical fiber 102. The mechanical waves 112 may cause short-term localized changes to the optical fiber 102 that modify light pulse reflection of the optical fiber 102. Accordingly, the phase-sensitive OTDR device 106 may detect the changes in the reflected light responsive to the mechanical waves 112.

For ease of description, the remainder of the description of FIG. 1 relates to using the mechanical waves 112 to disturb the optical fiber 102. However, in other embodiments, other modulated waves may be used to disturb the optical fiber 102. For example, an oscillating electric field may produce modulated waves to disturb the optical fiber 102. In another embodiment, an oscillating magnetic field may produce modulated waves to disturb the optical fiber 102. In this context, "disturbing" the optical fiber 102 refers to interacting with the optical fiber 102 in a manner that causes potentially localized, temporary changes to dimensions of the optical fiber 102 (e.g., via compression or expansion) or to optical characteristics of the optical fiber 102 (e.g., refractive index within a section of the optical fiber 102).

The phase-sensitive OTDR device 106 may be coupled to a transmitter 120. The phase-sensitive OTDR device 106 may determine a communication signal encoded in reflected backscattered light received at the phase-sensitive OTDR device 106 responsive to the mechanical waves 112 and may provide information from the communication signal to the transmitter 120. The transmitter 120 may transmit the information via radio frequency communications or other communications 122 to a remote receiver. For example, the remote receiver may be onboard a surface vehicle 124 remote from the phase-sensitive OTDR device 106 and remote from the underwater vehicle 110.

In a particular embodiment, the optical fiber 102 may be an externally protected undersea optical fiber that extends between a first land mass 132 and a second land mass 134. For example, the optical fiber 102 may be an existing telecommunications undersea fiber.

In operation, a system associated with the phase-sensitive OTDR device 106 may apply light pulses 104 to the optical fiber 102. In order to determine a backscatter light pattern associated with the optical fiber 102, the phase-sensitive OTDR device 106 or another system associated with the phase-sensitive OTDR device 106 may apply calibration light pulses to the optical fiber 102 at a time when the mechanical waves 112 are not being applied to the optical fiber 102. Background light pulses that are backscattered in response to the calibration light pulses may also be detected and used to determine the backscatter light pattern associated with the optical fiber 102. The phase-sensitive OTDR device 106 may receive backscattered light that includes a portion of the light pulses 104 applied to the optical fiber 102. A difference between the backscattered light and a backscattered pattern associated with the optical fiber 102 may be determined by the phase-sensitive OTDR device 106. The difference may indicate a communication signal encoded in the backscattered light responsive to the mechanical waves 112 applied to the optical fiber 102 at a location remote from the phase-sensitive OTDR device 106.

Thus, the underwater vehicle 110 may be able to wirelessly communicate with a remote system, such as a system associated with the phase-sensitive OTDR device 106 or the surface vehicle 124, using the mechanical waves 112. The mechanical waves 112 may include undersea acoustic waves, vibrations, or other mechanical waves. For example, the underwater vehicle 110 may directly contact the optical fiber 102 or an external protective layer associated with the optical fiber 102 in order to apply vibrations to the optical fiber 102. In another example, the undersea vehicle 110 may not be in direct contact with the optical fiber 102 and may transmit acoustic waves that cause vibrations that disturb the optical fiber 102 causing changes in the backscattered light. The mechanical waves 112 may be frequency modulated, amplitude modulated, or phase modulated in order to cause the changes in the backscattered light. Additionally, one or more frequencies of the mechanical waves 112 may be selected such that the mechanical waves 112 have high attenuation in water 130. Thus, the mechanical waves 112 may not propagate a large distance from the underwater vehicle 110, resulting in communications that do not significantly affect an underwater acoustic environment around the underwater vehicle 110.

Accordingly, the communication system 100 enables high-bandwidth, long distance wireless communication between the underwater vehicle 110 and the surface vehicle 124 using existing infrastructure, such as the optical fiber 102.

Figure 2:
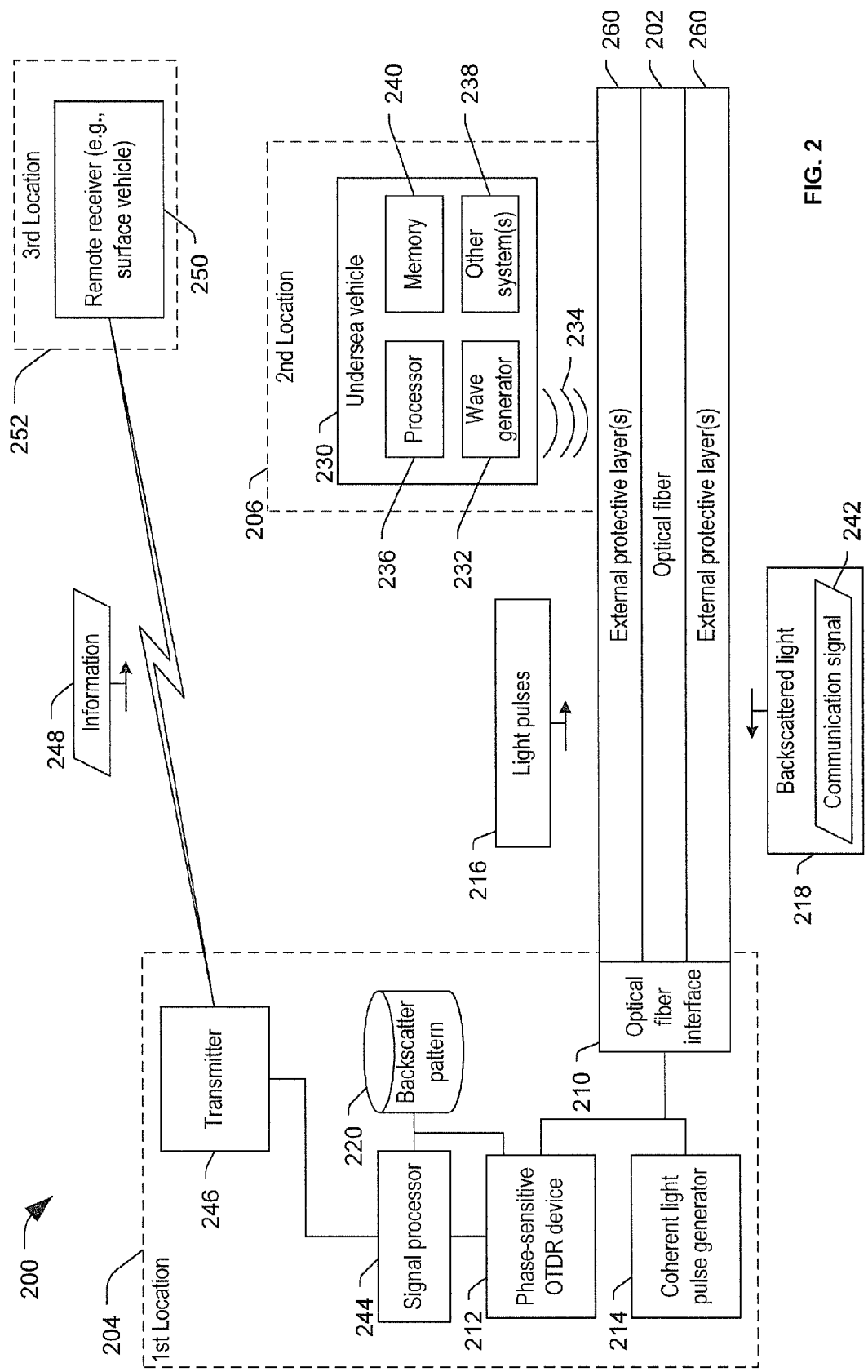
FIG. 2 is a block diagram illustrating a communication system using modulated waves applied to an optical fiber.

FIG. 2 is a block diagram of a wireless communication system 200. The wireless communication system 200 may include an optical fiber 202. The optical fiber 202 may extend between multiple locations such as a first location 204, a second location 206, and one or more additional locations (not shown). At the first location 204, an optical fiber interface 210 may be coupled to the optical fiber 202. A phase-sensitive optical time domain reflectometry (OTDR) device 212 may be coupled to the optical fiber 202 via the optical fiber interface 210. Additionally, a coherent light pulse generator 214 may be coupled to the optical fiber 202 via the optical fiber interface 210. The coherent light pulse generator 214 and the phase-sensitive OTDR device 212 may be integrated into a single device in certain embodiments. The coherent light pulse generator 214 may be adapted to apply coherent light pulses to the optical fiber 202. One or more additional devices may be coupled to the optical fiber 202 via the optical fiber interface 210. For example, a communication system that uses the optical fiber 202 to communicate between two or more land masses may be coupled to the optical fiber interface 210 at the first location 204.

The coherent light pulse generator 214 may apply light pulses 216 to the optical fiber 202. The phase-sensitive OTDR device 212 may be adapted to receive a backscatter portion of the light pulses 216 applied to the optical fiber 202 as backscattered light 218 from the optical fiber 202. The backscattered light 218 may have a background pattern that is associated with and characteristic of the optical fiber 202. The phase-sensitive OTDR device 212 may store information descriptive of the backscatter light in a pattern as a backscatter pattern 220 at a memory associated with the phase-sensitive OTDR device 212. In a particular embodiment, the phase-sensitive OTDR device 212 may apply calibration light pulses to the optical fiber 202 to determine the backscatter pattern 220 and may store the backscatter pattern 220 at the memory for future reference.

An undersea vehicle 230 may use the optical fiber 202 to encode communication signals that are detectable by the phase-sensitive OTDR device 212. In particular, the undersea vehicle 230 may operate at the second location 206 that is remote from the first location 204. The undersea vehicle 230 may include a wave generator 232 that is adapted to apply mechanical waves 234 (or other modulated waves that disturb the optical fiber 202) to the optical fiber 202 at the second location 206. The wave generator 232 may be responsive to a processor 236 or other systems 238 of the undersea vehicle 230. The wave generator 232 may encode information into the mechanical waves 234 via amplitude modulation, frequency modulation, phase modulation, or another modulation scheme. The other systems 238 of the undersea vehicle 230 may include data gathering systems such as cameras, sensors, or other data gathering devices that may store data at a memory 240 of the undersea vehicle 230. After data gathering, the undersea vehicle 230 may move to or near to the second location 206 associated with the optical fiber 202, and the data stored in the memory 240 may be encoded into the mechanical waves 234 by the wave generator 232 and applied to the optical fiber 202. The second location 206 may be any location along a length of the optical fiber 202 that is within a detection range of the phase-sensitive OTDR device 212. In a particular embodiment, the phase-sensitive OTDR device 212 may be able to detect vibrations or backscattered light 218 associated with the mechanical waves 234 from a distance of at least 25 km.

In response to the mechanical waves 234, the backscattered light 218 may be modified to include a communication signal 242. For example, the mechanical waves 234 may cause changes in spacing or other characteristics of backscattering elements of the optical fiber 202, resulting in an encoding of the communication signals 242 and the backscattered light 218. The phase-sensitive OTDR device 212 may receive the backscattered light 218 and may provide the backscattered light 218 or information descriptive of the backscattered light 218 to a signal processor 244. The signal processor 244 or the phase-sensitive OTDR device 212 may determine a difference between the backscattered light 218 and the backscatter pattern 220 associated with the optical fiber 202. Additionally, the signal processor 244 or the phase-sensitive OTDR device 212 may determine (e.g., by use of a decoder) the communication signal 242 encoded within the backscattered light 218 responsive to the mechanical waves 234 based on the difference between the backscattered light 218 and the backscatter pattern 220. In a particular embodiment, the signal processor 244 may be coupled to a transmitter 246 that is adapted to send information 248 derived from the communication signal 242 to a remote receiver 250. The remote receiver 250 may include a surface vessel, a vehicle, or other receiver at a third location 252. The third location 252 may be remote from the first location 204, remote from the second location 206, or both.

In a particular embodiment, the optical fiber 202 may be an undersea optical fiber extending between two land masses. Accordingly, the optical fiber 202 may have one or more external protective layers 260. For example, the external protective layers 260 may include water barriers, abrasion barriers, structural elements such as steel wires or fibers, protective housings, such as tubes through which the optical fiber extends along with one or more optical fibers, as well as a liquid or a gel. The mechanical waves 234 may include vibrations or acoustical waves or other mechanical waves that are selected based on construction of the optical fiber 202 and the external protective layers 260 to enable the mechanical waves 234 to modify the backscattered light 218 through the external protective layers 260. For example, a frequency, an intensity, or other characteristics or parameters of the mechanical waves 234 may be selected based on the construction of the optical fiber 202 and the external protective layers 260. One or more parameters of the mechanical waves 234 may also be selected to have high attenuation at the second location 206. For example, the mechanical waves 234 may be selected to have high attenuation in water. Thus, transmission of the mechanical waves 234 from the underwater vehicle 230 may not significantly affect an underwater acoustic environment around the underwater vehicle 230. In another embodiment, an oscillating electric field may produce the modulated waves to modify the backscattered light 218 through the external protective layers 260. In yet another embodiment, an oscillating magnetic field may produce the modulated waves to modify the backscattered light 218 through the external protective layers 260.

Additionally, the light pulses 216 may be selected to have high backscatter in the optical fiber 202. Further, the characteristics of the light pulses 216, such as wavelength or frequency, may be selected based on a distance between the first location 204 and the second location 206, or based on a distance between a location at which the mechanical waves 234 are applied and the phase-sensitive OTDR device 212.

Using mechanical waves or other modulated waves to transfer a detectable signal to an optical fiber, such as the optical fiber 202, enables high-bandwidth, long distance wireless communication between an underwater vehicle, such as the undersea vehicle 230, and multiple locations.

Figure 3:
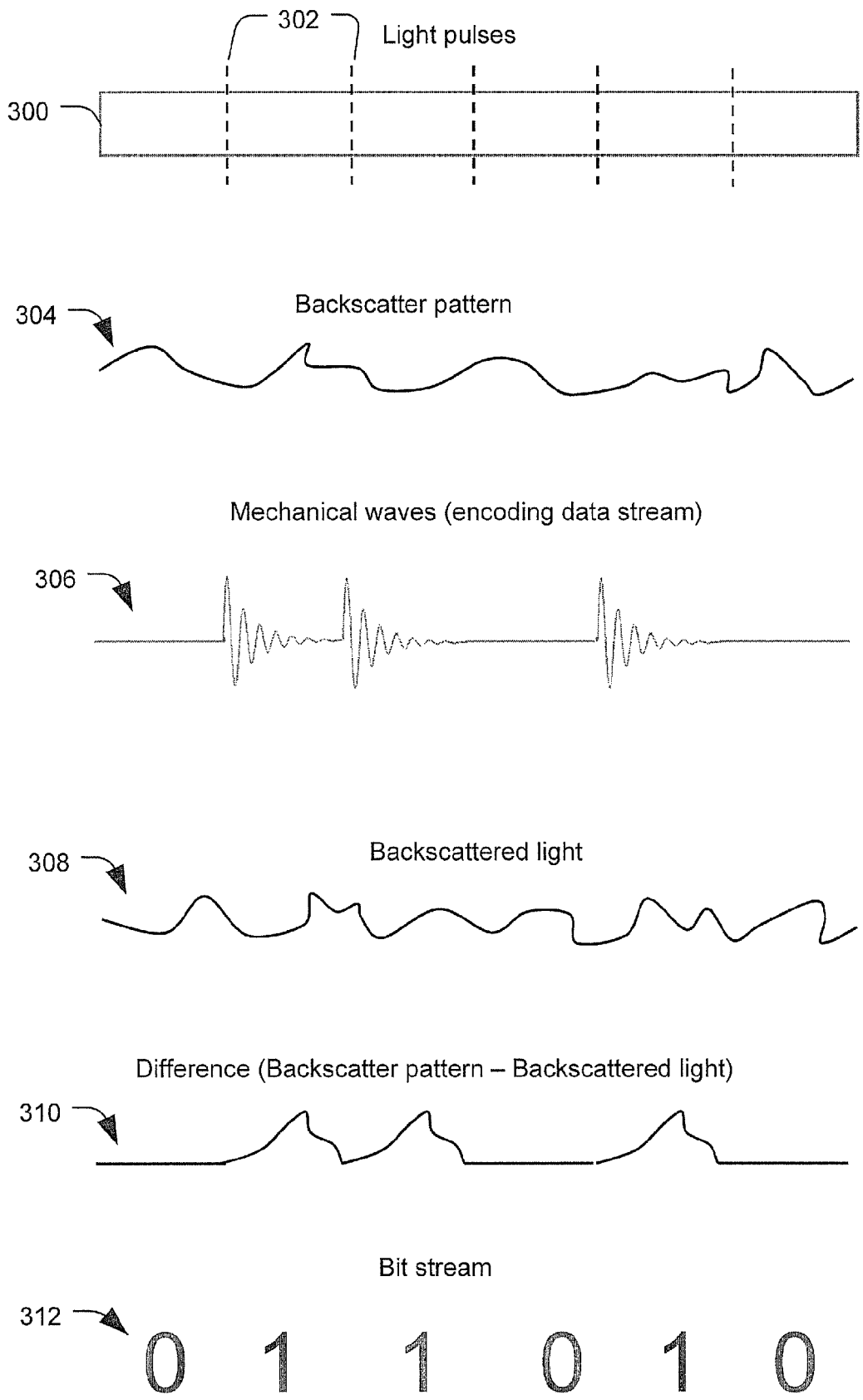
FIG. 3 is a diagram of a particular embodiment illustrating communication of information via backscattered light.

FIG. 3 is a diagram illustrating communication of information via backscattered light according to a particular embodiment. In FIG. 3, light pulses 302 are applied to an optical fiber 300. The light pulses may include coherent light pulses having a known frequency and other characteristics. The optical fiber 300 may include a dopant, other materials, defects, and/or inhomogeneities that cause a portion of the light pulses 302 to be reflected or backscattered. Accordingly, a backscatter pattern 304 associated with the optical fiber 300 and the particular characteristics of the light pulses 302 may be determined. Mechanical waves 306, or other modulated waves, may be applied to the optical fiber 300 at a remote location. The mechanical waves 306 may encode information via amplitude modulation, frequency modulation, or phase modulation. For example, the mechanical waves 306 may include acoustic waves or vibrations. The mechanical waves 306 may cause temporary, reversible changes in the backscatter pattern 304 of the optical fiber 300 responsive to the light pulses 302. Accordingly, during application of the mechanical waves 306, backscattered light 308 may be detected at the optical fiber 300 responsive to the light pulses 302 by a phase-sensitive optical time domain reflectometry (OTDR) device (not shown). A difference between the backscatter pattern 304 and the backscattered light 308 may be determined as the difference 310. The difference 310 may indicate a bit stream 312 encoded in the mechanical waves 306 that is detectable by the phase-sensitive OTDR device.

Figure 4:
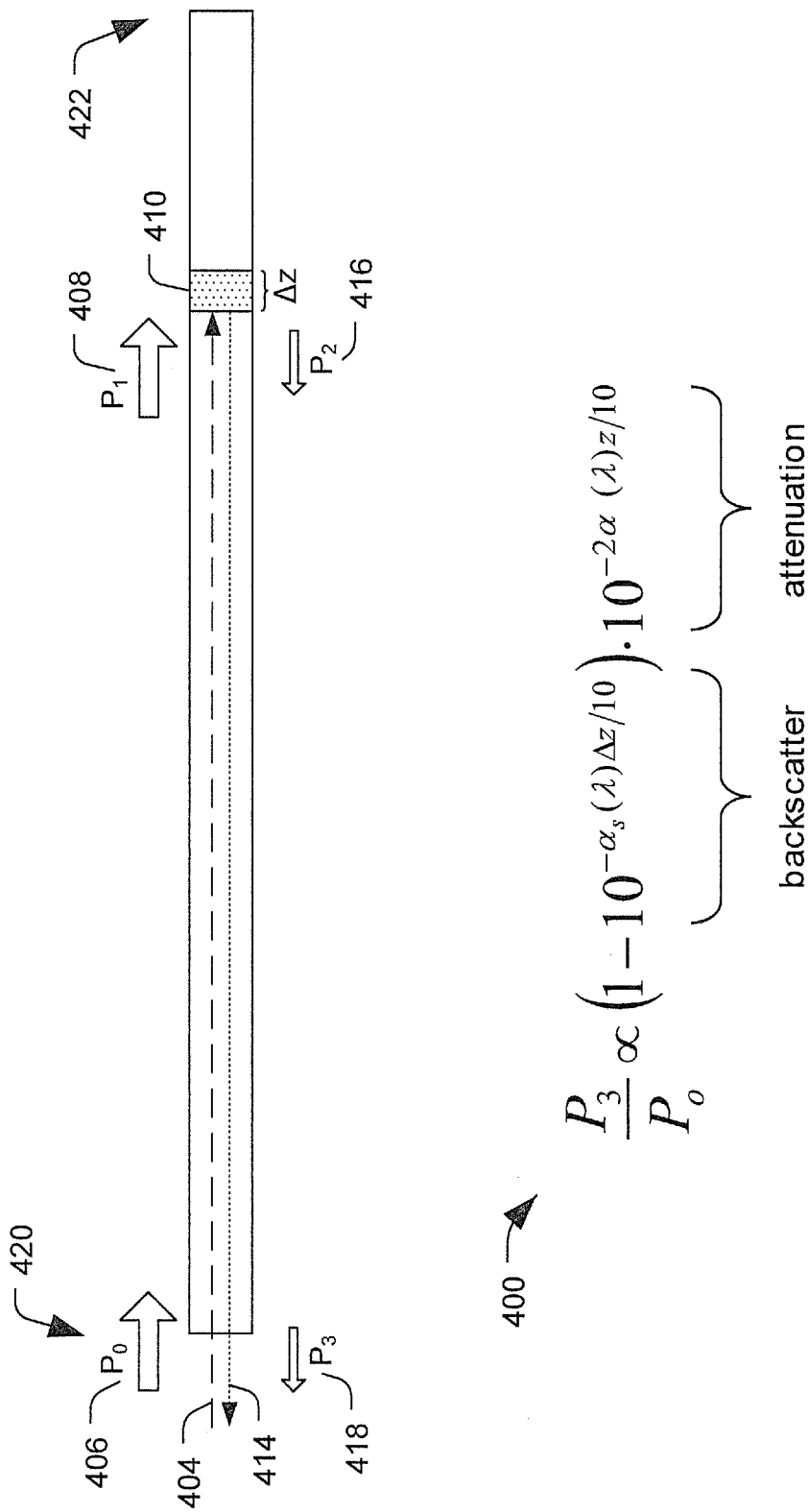
FIG. 4 is a diagram illustrating a relationship between backscattered light and applied light pulses.

FIG. 4 illustrates a relationship 400 between backscattered light and applied light pulses. In FIG. 4, light pulses 404 are applied to an optical fiber 402 having a first end 420 and a second end 422. In a particular embodiment, light of the applied light pulses 404 may have a frequency that is selected to have high backscatter in the optical fiber 402. When the light pulses 404 are applied they have an intensity 406 indicated by $P_0$. At a length down the optical fiber 402, the light pulses 404 have attenuated somewhat due to characteristics of the optical fiber 402 and have a second intensity 408 indicated by $P_1$. Mechanical waves or other modulated waves may be applied to the optical fiber 402 at a particular location, such as at a scattering segment 410 of the optical fiber 402, disturbing the scattering segment 410 of the optical fiber 402. Within the scattering segment 410, characteristics of the optical fiber 402 may be modified by application of the mechanical waves or the other modulated waves. Accordingly, backscattered light 414 may be backscattered by application of the mechanical waves or the other modulated waves to the scattering segment 410. The backscattered light 414 may be less intense than the applied light pulses 404. The backscattered light 414 have an intensity 416 indicated by $P_2$. The backscattered light 414 may travel back along the optical fiber 402 until it is received at the first end 420 where it has an intensity 418 indicated by $P_3$. Accordingly, a relationship between the intensity of the backscattered light 418 designated by $P_3$ and the intensity of the applied light pulses 406 designated by $P_0$ can be determined. By modifying the backscatter of the scattering segment 410 using mechanical waves or other modulated waves, information may be encoded in the backscattered light.

Figure 5:
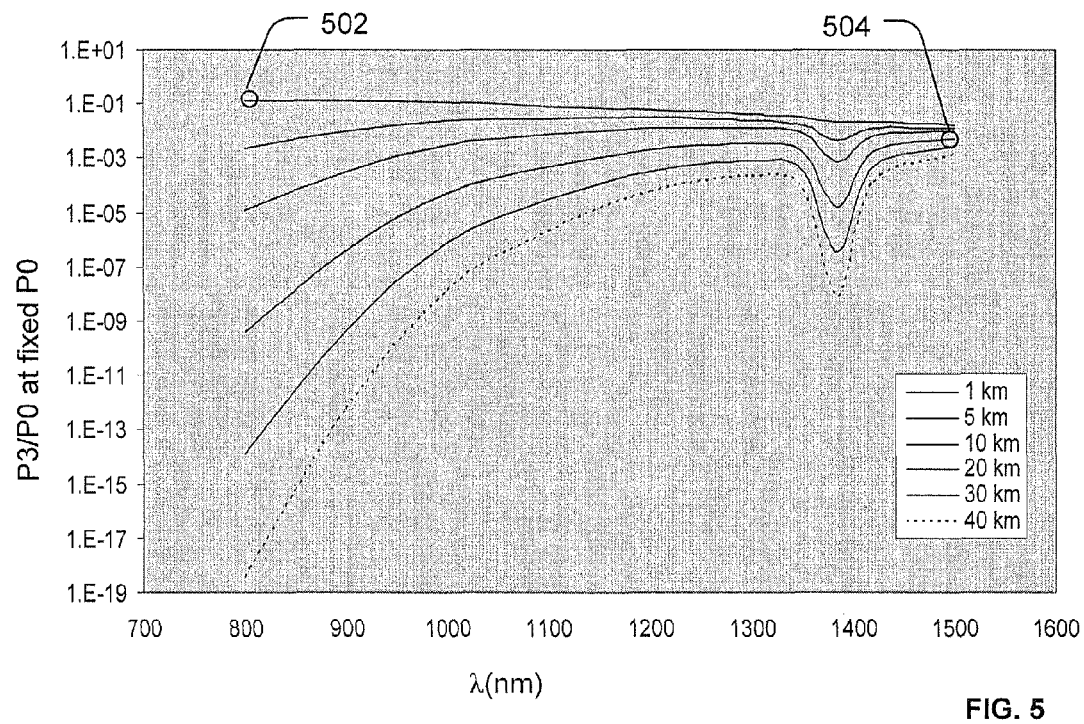
FIG. 5 is a graph illustrating an intensity ratio $P_3:P_0$ of various wavelengths of light at various distances along an optical fiber.

FIG. 5 is a graph illustrating a ratio $P_3:P_0$, as described with reference to FIG. 4, of various wavelengths of light at various distances along the optical fiber 402. A particular wavelength of light applied to the optical fiber 402 in order to detect encoded communications via mechanical waves or other modulated waves at the scattering segment 410 may be selected such that the ratio $P_3:P_0$ is relatively large. The ratio $P_3:P_0$ may be large where attenuation is small and backscatter of the optical fiber 402 is large. For example, when a distance between a phase-sensitive optical time domain reflectometry (OTDR) device and the scattering segment 410 is approximately 1 km, a wavelength of approximately 800 nm may achieve a largest ratio of $P_3:P_0$ as indicated at 502. However, when the distance between the phase-sensitive OTDR device and the scattering segment 410 is approximately 20 km, a wavelength of approximately 1500 nm may achieve a larger ratio of $P_3:P_0$ than the ratio $P_3:P_0$ achieved at the wavelength of approximately 800 nm and may therefore be preferable. Thus, characteristics of light applied to the optical fiber, such as a wavelength of the light, may be selected based on a distance between the phase-sensitive OTDR device and a location at which mechanical waves or other modulated waves are applied to the optical fiber 402 in order to provide an improved backscatter response by increasing the ratio of $P_3:P_0$ as described with reference to FIG. 4 and FIG. 5.

Figure 6:
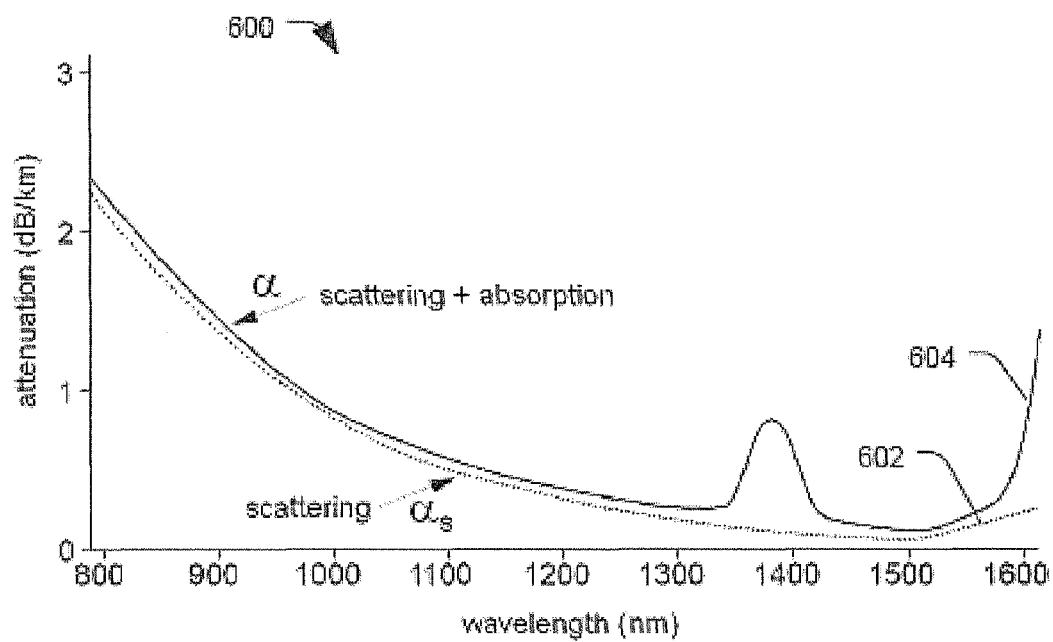
FIG. 6 is a graph of a particular embodiment illustrating attenuation per kilometer for various wavelengths of light.

FIG. 6 is a graph 600 illustrating attenuation per kilometer for various wavelengths of light, as described with reference to FIG. 4. As described above, a particular wavelength of light applied to the optical fiber 402 in order to detect encoded communications at the scattering segment 410 may be selected such that the ratio $P_3:P_0$ is relatively large. In the graph 600, the attenuation per kilometer may include an absorption component and a scattering component. A sum total of scattering components of various wavelengths of light per kilometer of fiber is shown as dotted line curve 602. The scattering components may be illustrative of intrinsic losses due mainly to Rayleigh scattering. A sum total of scattering components and absorption components (i.e., total attenuation) of various wavelengths of light per kilometer of fiber is shown as solid line curve 604. A difference between the curve 604 and the curve 602 provides the absorption component. Thus, characteristics of light applied to the optical fiber, such as a wavelength of the light, may be selected based on an attenuation per kilometer of the wavelength of the light in order to provide an improved backscatter response by increasing the ratio of $P_3:P_0$ as described with reference to FIG. 4.

Figure 7:
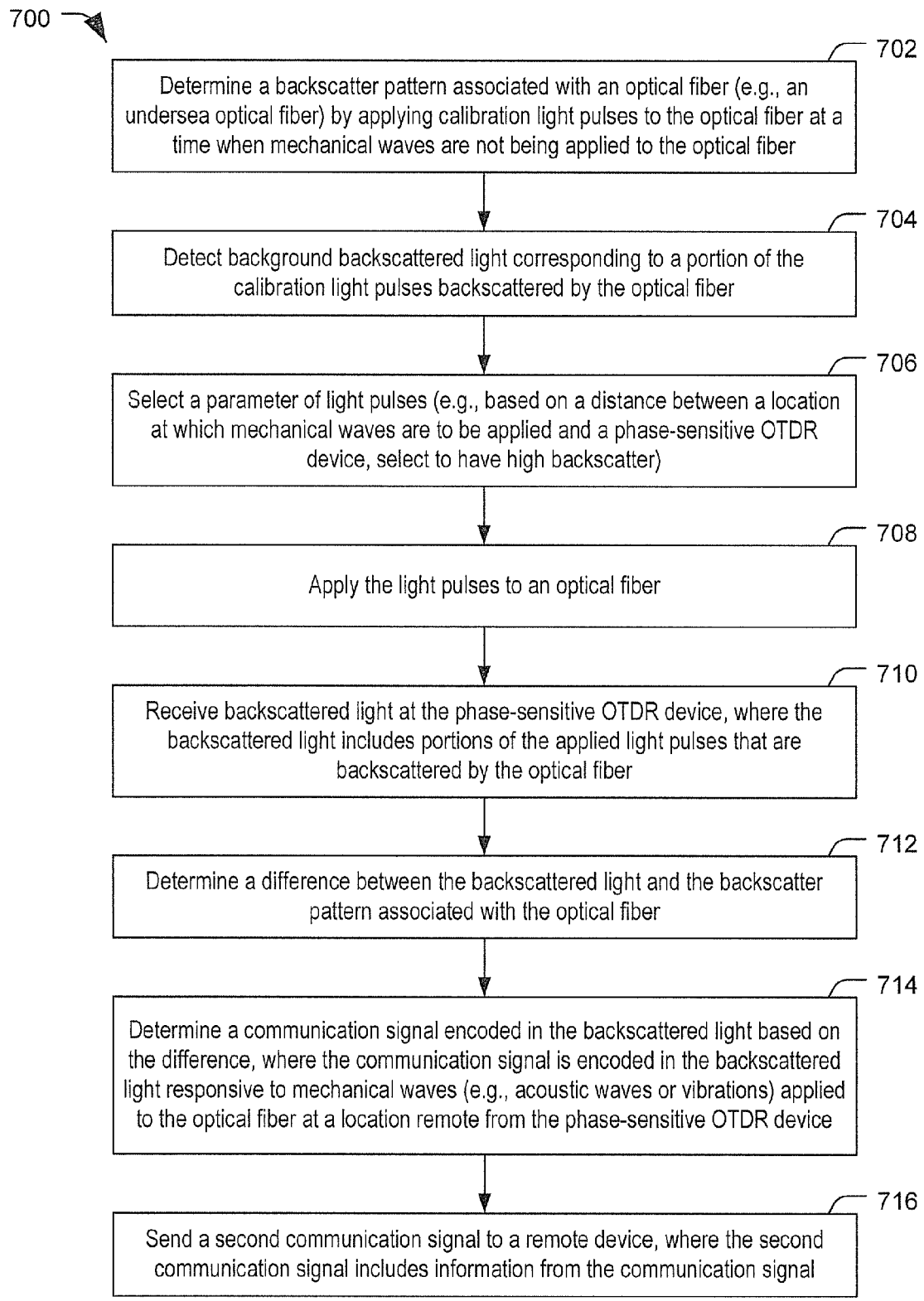
FIG. 7 is a flow chart of a first particular embodiment of a method of communication using modulated waves applied to an optical fiber.

FIG. 7 is a flowchart of a first particular embodiment of a method of wireless communication using mechanical waves or other modulated waves applied to an optical fiber. The method 700 includes determining a backscatter pattern associated with an optical fiber (e.g., an undersea optical fiber) by applying calibration light pulses to the optical fiber at a time when the mechanical waves or other modulated waves are not being applied to the optical fiber, at 702. For example, the phase-sensitive OTDR device 106, or another system associated with the phase-sensitive OTDR device 106, may apply calibration light pulses to the optical fiber 102 at a time when the mechanical waves 112 are not being applied to the optical fiber 102.

Background backscattered light corresponding to a portion of the calibration light pulses may be backscattered by the optical fiber and may be detected, at 704. A parameter of light pulses to be applied to the optical fiber, such as a wavelength or a frequency of the optical fiber and an intensity of the light pulses may be selected, at 706. For example, the parameter may be selected based on a distance between a location at which the mechanical waves or other modulated waves are to be applied and a location of a phase-sensitive optical time domain reflectometry (OTDR) device. In another example, a parameter may be selected to cause a high backscatter of the applied light pulses in the optical fiber.

The light pulses may be applied to the optical fiber, at 708. Backscattered light may be received at the phase-sensitive OTDR device, at 710. The backscattered light may include portions of the applied light pulses that are backscattered by the optical fiber. Additionally, the backscattered light may encode communication signals that are encoded in the backscattered light via the mechanical waves or other modulated waves applied to the optical fiber at a location remote from the phase-sensitive OTDR device. A difference between the backscattered light and the backscatter pattern associated with the optical fiber may be determined, at 712. The difference may correspond to or may be processed to detect encoded information in the backscattered light. Accordingly, at 714, a communication signal encoded in the backscattered light may be determined based on the difference. The communication signal may be encoded in the backscattered light responsive to the mechanical waves or other modulated waves applied to the optical fiber at the remote location. The mechanical waves may include frequency modulated, amplitude modulated, or phase modulated acoustic waves or vibrations or other mechanical waves. The other modulated waves may be produced by an oscillating electric field or an oscillating magnetic field. A system associated with the phase-sensitive OTDR device 106 may apply light pulses 104 to the optical fiber 102. The phase-sensitive OTDR device 106 may receive backscattered light that includes a portion of the light pulses 104 applied to the optical fiber 102. A difference between the backscattered light and a backscatter pattern associated with the optical fiber 102 may be determined by the phase-sensitive OTDR device 106. The difference may indicate a communication signal encoded in the backscattered light responsive to the mechanical waves 112 applied to the optical fiber 102 at a location remote from the phase-sensitive OTDR device 106.

A second communication signal may be sent to a remote device, at 716. The second communication signal may include information from the communication signal transmitted via the optical fiber. For example, the phase-sensitive OTDR device 106 may be coupled to the transmitter 120. The phase-sensitive OTDR device 106 may determine a communication signal encoded in reflected backscattered light received at the phase-sensitive OTDR device 106 responsive to the mechanical waves 112 applied to the optical fiber 102 and may provide information from the communication signal to the transmitter 120. The transmitter 120 may transmit the information via radio frequency communications or other communications 122 to a remote receiver. For example, the remote receiver may be onboard the surface vehicle 124 remote from the phase-sensitive OTDR device 106 and remote from the underwater vehicle 110.

Accordingly, an undersea vehicle or other wave generator in the vicinity of the optical fiber may apply mechanical waves or other modulated waves in order to disturb the optical fiber to transmit information to the remote receiver.

Figure 8:
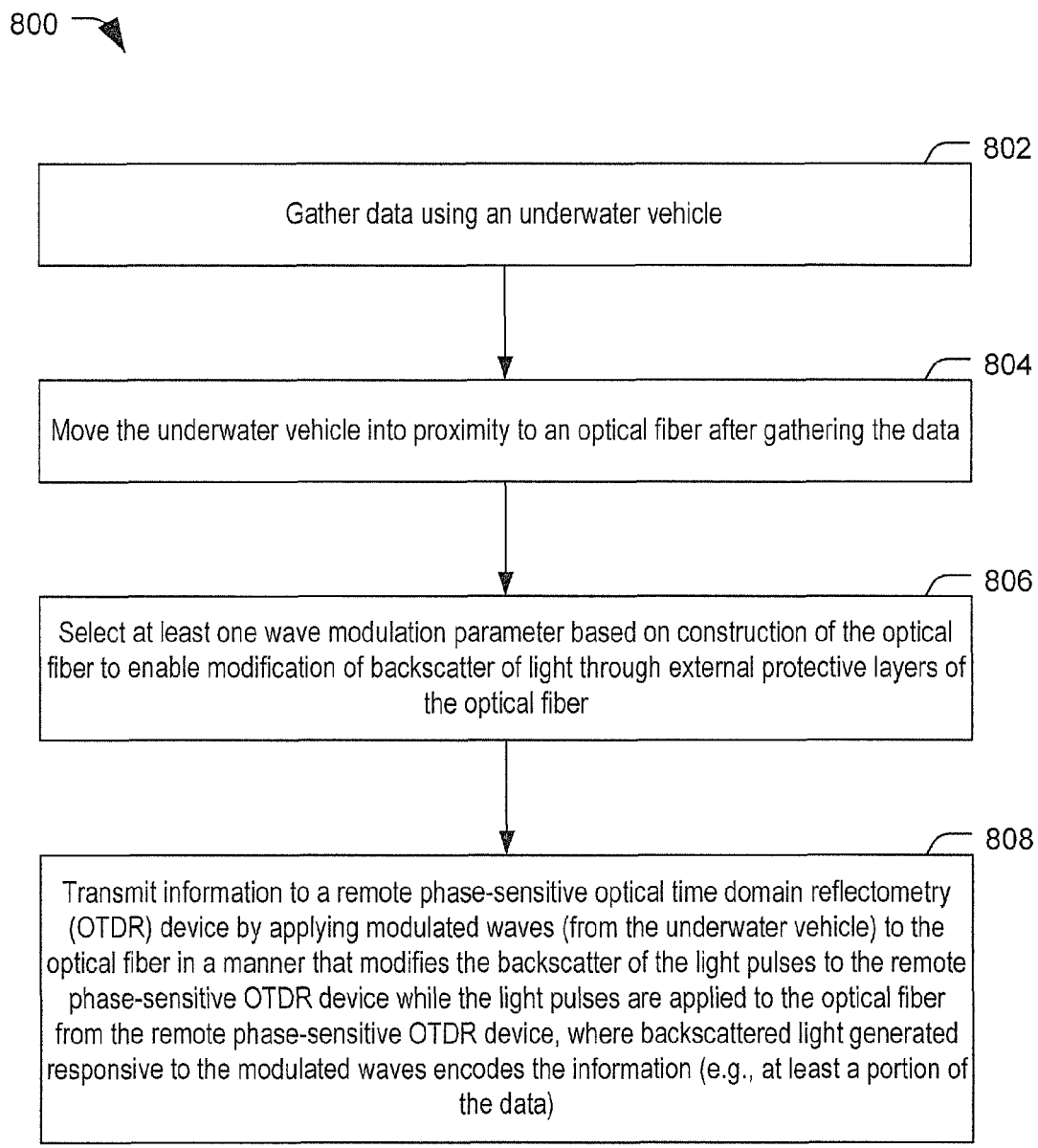
FIG. 8 is a flow chart of a second particular embodiment of a method of communication using modulated waves applied to an optical fiber.

FIG. 8 is a flowchart of a second embodiment of a method of wireless communication using waves applied to an optical fiber. The method 800 includes gathering data using an underwater vehicle, at 802. After gathering data using the underwater vehicle, the underwater vehicle may be moved into proximity to an optical fiber, at 804. For example, the optical fiber may include an existing undersea optical fiber used for communication between two or more land masses. At least one wave modulation parameter may be selected based on a construction of the optical fiber, at 806. The wave modulation parameter may be selected to enable modification of backscattered light through an external protective layer of the optical fiber. For example, a frequency, an intensity, or other characteristics or parameters of the waves may be selected based on the construction of the optical fiber 202 and the external protective layers 260. In a particular embodiment, where the optical fiber was previously selected, the wave modulation parameter may be predetermined based on the construction of the optical fiber. The method 800 may also include transmitting information to a remote phase-sensitive optical time domain reflectometry (OTDR) device by applying the modulated waves to the optical fiber, at 808. The modulated waves may be applied to the optical fiber 202 to transmit at least a portion of the data gathered by the undersea vehicle 230 in a manner that modifies the backscattered light to the remote OTDR device while light pulses are applied by the OTDR device or another device to the optical fiber. Backscattered light generated in response to the modulated waves may encode information such as at least a portion of the data gathered by the undersea vehicle 230.

To illustrate, while light pulses are applied to an optical fiber from a remote phase-sensitive optical time domain reflectometry (OTDR) device, information may be transmitted to the phase-sensitive OTDR device by applying modulated waves to the optical fiber in a manner that modifies backscatter of the light pulses to the phase-sensitive OTDR device, where backscattered light generated responsive to the modulated waves encode the information.

For example, an optical path length (OPL) change in the optical fiber can be detected by the phase-sensitive OTDR device. The OPL change can be achieved by changing the optical fiber's dimensions (e.g., by stretching/compressing the optical fiber) or by changing the optical fiber's refractive index. As described above, a mechanical wave may be used to modify the OPL by changing the optical fiber's dimensions (stretch/compress). In another embodiment, an oscillating electric field may be used to modify the optical fiber's dimensions via an electrostriction effect or to modify the optical fiber's refractive index via another electro-optic effect. In another embodiment, an oscillating magnetic field may be used to modify the optical fiber's dimensions via a magnetostriction effect or to modify the optical fiber's refractive index via a magneto-optic effect.

To illustrate, a system associated with the phase-sensitive OTDR device 106 may apply light pulses 104 to the optical fiber 102. Modulated waves, such as the mechanical waves 112, may be applied to the optical fiber 102 at a location remote from the phase-sensitive OTDR device 106. The phase-sensitive OTDR device 106 may receive backscattered light that includes a portion of the light pulses 104 applied to the optical fiber 102. A difference between the backscattered light and a backscatter pattern associated with the optical fiber 102 may be determined by the phase-sensitive OTDR device 106. The difference may indicate a communication signal encoded in the backscattered light responsive to the mechanical waves 112 applied to the optical fiber 102 at a location remote from the phase-sensitive OTDR device 106.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. For example, method steps may be performed in a different order than is shown in the figures or one or more method steps may be omitted. Accordingly, the disclosure and the figures are to be regarded as illustrative rather than restrictive.

Moreover, although specific embodiments have been illustrated and described herein, it should be appreciated that any subsequent arrangement designed to achieve the same or similar results may be substituted for the specific embodiments shown. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, the claimed subject matter may be directed to less than all of the features of any of the disclosed embodiments.

What is claimed is:

1. A method comprising:
   applying light pulses to an optical fiber;
   receiving backscattered light at a phase-sensitive optical time domain reflectometry (OTDR) device, wherein the backscattered light includes portions of the light pulses that are backscattered by the optical fiber;
   determining a difference between the backscattered light and a backscatter pattern associated with the optical fiber; and
   determining a communication signal encoded in the backscattered light based on the difference, wherein the communication signal is encoded in the backscattered light responsive to modulated waves applied to the optical fiber by a wave generator that is in direct contact with a protective layer of the optical fiber at a location that is remote from the phase-sensitive OTDR device, wherein the wave generator is a portion of an underwater vehicle.

2. The method of claim 1, wherein the optical fiber comprises an undersea optical fiber.

3. The method of claim 1, wherein the light pulses have one or more frequencies that are selected to have high backscatter in the optical fiber.

4. The method of claim 1, wherein the modulated waves include mechanical vibrations.

5. The method of claim 4, wherein the mechanical vibrations have one or more frequencies that are selected to have high attenuation in water.

6. The method of claim 1, further comprising sending a second communication signal to a remote device, wherein the second communication signal includes information determined from the communication signal encoded in the backscatter light.

7. The method of claim 1, further comprising:
   determining the backscatter pattern associated with the optical fiber by applying calibration light pulses to the optical fiber at a time when the modulated waves are not being applied to the optical fiber; and
   detecting background backscattered light corresponding to portions of the calibration light pulses backscattered by the optical fiber.

8. The method of claim 1, wherein the modulated waves are frequency modulated to transmit information that is encoded in the communication signal.

9. The method of claim 1, wherein the modulated waves are amplitude modulated to transmit information that is encoded in the communication signal.

10. The method of claim 1, further comprising selecting a wavelength of the light pulses based on a distance between the location at which the modulated waves are applied and a location of the phase-sensitive OTDR device.

11. A system comprising:
an optical fiber interface configured to be coupled to an optical fiber;
a phase-sensitive optical time domain reflectometry (OTDR) device coupled to the optical fiber interface, the phase-sensitive OTDR device adapted to receive backscattered light that includes portions of light pulses applied to the optical fiber that are backscattered by the optical fiber; and
a signal processor coupled to the phase-sensitive OTDR device, the signal processor configured to determine a difference between the backscattered light and a backscatter pattern associated with the optical fiber and to determine a communication signal encoded in the backscattered light based on the difference, wherein the communication signal is encoded in the backscattered light responsive to modulated waves applied to the optical fiber by a wave generator that is in direct contact with a protective layer of the optical fiber at a location that is remote from the phase-sensitive OTDR device, wherein the wave generator is a portion of an underwater vehicle.

12. The system of claim 11, wherein the optical fiber comprises an undersea optical fiber extending between two land masses.

13. The system of claim 11, wherein the modulated waves include vibrations.

14. The system of claim 11, wherein the modulated waves include an oscillating electric field or an oscillating magnetic field.

15. The system of claim 11, further comprising a coherent light pulse generator coupled to the optical fiber interface and configured to apply the light pulses to the optical fiber.

16. The system of claim 11, further comprising a second wave generator to send information via the communication signal to a remote receiver using radio frequency communications.

17. The system of claim 16, wherein the remote receiver includes a surface vehicle that is remote from the underwater vehicle.

18. A method comprising:
applying light pulses to an optical fiber from a remote phase-sensitive optical time domain reflectometry (OTDR) device while a wave generator that is in direct contact with a protective layer of the optical fiber applies modulated waves to the optical fiber, wherein the modulated waves cause a scattering segment of the optical fiber to backscatter a portion of the light pulses to the phase-sensitive OTDR device as backscattered light, and wherein the backscattered light includes encoded information from the wave generator, wherein the wave generator is a portion of an underwater vehicle.

19. The method of claim 18, further comprising:
gathering data using the underwater vehicle;
after gathering the data, moving the underwater vehicle into proximity to the optical fiber; and
causing the wave generator to directly contact the protective layer of the optical fiber at the scattering segment to transmit at least a portion of the data as the encoded information.

20. The method of claim 18, wherein at least one parameter of the modulated waves is selected based on construction of the optical fiber to enable modification of the backscatter of the light pulses through the protective layer of the optical fiber.

* * * * *